United States Patent
Aoyama et al.

(10) Patent No.: US 10,597,056 B2
(45) Date of Patent: Mar. 24, 2020

(54) TRAIN CONTROL SYSTEM, BASE-STATION CONTROL DEVICE, GROUND WIRELESS BASE STATION, AND ON-VEHICLE WIRELESS STATION

(71) Applicant: MITSUBISHI ELECTRIC CORPORATION, Chiyoda-ku, Tokyo (JP)

(72) Inventors: Tetsuya Aoyama, Tokyo (JP); Seiya Nagashima, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 274 days.

(21) Appl. No.: 15/540,205

(22) PCT Filed: Feb. 12, 2015

(86) PCT No.: PCT/JP2015/053859
§ 371 (c)(1),
(2) Date: Jun. 27, 2017

(87) PCT Pub. No.: WO2016/129086
PCT Pub. Date: Aug. 18, 2016

(65) Prior Publication Data
US 2018/0334179 A1 Nov. 22, 2018

(51) Int. Cl.
*B61L 27/00* (2006.01)
*G08C 21/00* (2006.01)
(Continued)

(52) U.S. Cl.
CPC ....... *B61L 27/0005* (2013.01); *B61L 15/0018* (2013.01); *B61L 15/0027* (2013.01);
(Continued)

(58) Field of Classification Search
CPC .... B61L 1/00; B61L 1/18; B61L 25/00; B61L 25/02; B61L 25/04; B61L 27/00; B61L 27/0005; B61L 27/04
See application file for complete search history.

(56) References Cited

U.S. PATENT DOCUMENTS 9,294,928 B2  3/2016 Hasegawa et al.
9,706,549 B2  7/2017 Taira
(Continued)

FOREIGN PATENT DOCUMENTS

JP  2000-333231 A  11/2000
JP  2003-123394 A  4/2003
(Continued)

OTHER PUBLICATIONS

Office Action (Notification of Reasons for Refusal) dated Oct. 24, 2017, by the Japanese Patent Office in corresponding Japanese Patent Application No. 2016-574583 and English translation of the Office Action. (5 pages).
(Continued)

*Primary Examiner* — Robert J McCarry, Jr.
(74) *Attorney, Agent, or Firm* — Buchanan Ingersoll & Rooney PC

(57) ABSTRACT

A train control system controls an operation of a train by transmitting and receiving, between an on-vehicle wireless station mounted on the train and a ground wireless base station, information that includes train control information by wireless communication. General transmission information, which is information included in the information that includes the train control information and is transmitted only once from the ground wireless base station to the on-vehicle wireless station. The train control information is transmitted repeatedly a plurality of times from the ground wireless base station to the on-vehicle wireless station. Among the repeatedly transmitted train control information, the on-vehicle
(Continued)

wireless station uses, for an operation of the train, a piece of train control information, which the on-vehicle wireless station receives without lack of data lack for a first time.

12 Claims, 16 Drawing Sheets

(51) Int. Cl.
- H04B 5/00 (2006.01)
- B61L 15/00 (2006.01)
- H04L 1/08 (2006.01)
- H04B 7/02 (2018.01)
- H04W 4/42 (2018.01)
- H04W 72/04 (2009.01)
- H04W 84/00 (2009.01)

(52) U.S. Cl.
CPC .......... *B61L 27/0038* (2013.01); *G08C 21/00* (2013.01); *H04B 5/00* (2013.01); *H04B 7/02* (2013.01); *H04L 1/08* (2013.01); *H04W 4/42* (2018.02); *H04W 72/0446* (2013.01); *B61L 2201/00* (2013.01); *B61L 2205/00* (2013.01); *H04W 84/005* (2013.01)

(56) References Cited

U.S. PATENT DOCUMENTS

| | | |
|---|---|---|
| 2004/0257900 A1 | 12/2004 | Takagi et al. |
| 2006/0184857 A1 | 8/2006 | Takagi et al. |
| 2006/0206782 A1 | 9/2006 | Takagi et al. |
| 2006/0236193 A1 | 10/2006 | Takagi et al. |
| 2007/0300122 A1 | 12/2007 | Takagi et al. |
| 2007/0300124 A1 | 12/2007 | Takagi et al. |
| 2008/0065949 A1 | 3/2008 | Takagi et al. |
| 2008/0065950 A1 | 3/2008 | Takagi et al. |
| 2008/0065951 A1 | 3/2008 | Takagi et al. |
| 2008/0170540 A1 | 7/2008 | Fukuda |
| 2010/0131821 A1 | 5/2010 | Takagi et al. |
| 2011/0228759 A1 | 9/2011 | Futagi et al. |
| 2011/0269404 A1* | 11/2011 | Hu .......................... H01Q 1/246 455/67.11 |
| 2014/0098764 A1 | 4/2014 | Futagi et al. |
| 2014/0348124 A1 | 11/2014 | Hasegawa et al. |
| 2015/0215935 A1 | 7/2015 | Taira |
| 2015/0358110 A1 | 12/2015 | Futagi et al. |
| 2016/0352453 A1 | 12/2016 | Futagi et al. |

FOREIGN PATENT DOCUMENTS

| | | |
|---|---|---|
| JP | 2008-177754 A | 7/2008 |
| JP | 2009-171078 A | 7/2009 |
| JP | 2009-225135 A | 10/2009 |
| JP | 2009-253523 A | 10/2009 |
| JP | 2011-120009 A | 6/2011 |
| JP | 2012-029253 A | 2/2012 |
| JP | 2012-212955 A | 11/2012 |
| JP | 2013-042352 A | 2/2013 |
| JP | 2013-239935 A | 11/2013 |
| JP | 2014-123904 A | 7/2014 |
| WO | WO 2010/064407 A1 | 6/2010 |
| WO | 2013/042529 A1 | 3/2013 |
| WO | 2014/045401 A1 | 3/2014 |

OTHER PUBLICATIONS

Office Action (Notification of Reasons for Refusal) dated Feb. 6, 2018, by the Japanese Patent Office in corresponding Japanese Patent Application No. 2016-574583, and an English Translation of the Office Action. (5 pages).

International Search Report (PCT/ISA/210) dated Apr. 14, 2015, by the Japanese Patent Office as the International Searching Authority for International Application No. PCT/JP2015/053859.

Written Opinion (PCT/ISA/237) dated Apr. 14, 2015 by the Japanese Patent Office as the International Searching Authority for International Application No. PCT/JP2015/053859.

Office Action dated Oct. 28, 2019, by the India Patent Office in corresponding India Patent Application No. 201747026488 and English translation of the Office Action. (6 pages).

* cited by examiner

FIG.4

| WIRELESS RESOURCE ID | ON-VEHICLE WIRELESS STATION |
|---|---|
| 1 | ON-VEHICLE WIRELESS STATION 21 |
| 2 | ON-VEHICLE WIRELESS STATION 22 |
| 3 | UNALLOCATED |
| 4 | UNALLOCATED |

FIG.8
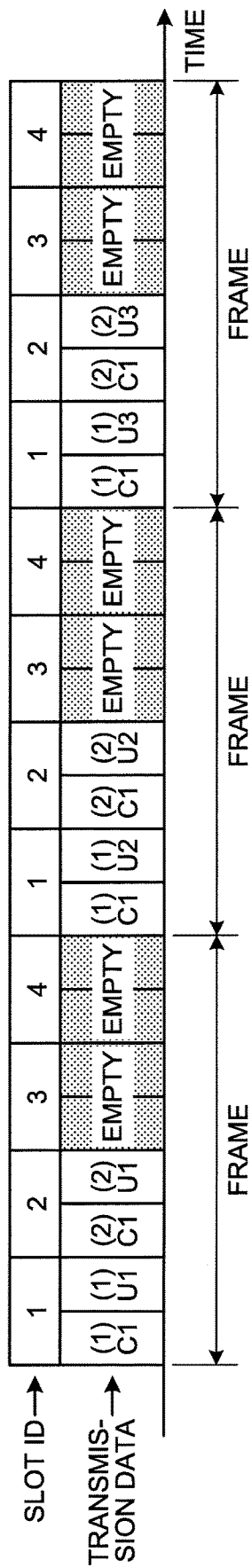
(A) FORE SIDE WIRELESS LINK
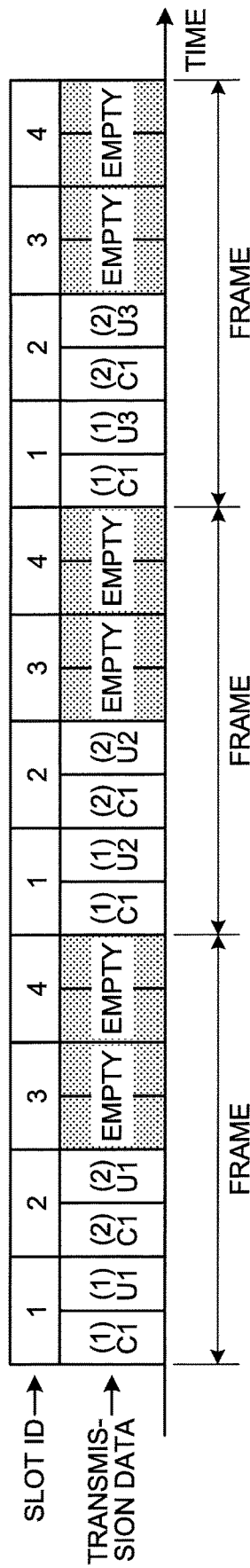
(B) REAR SIDE WIRELESS LINK FIG.9
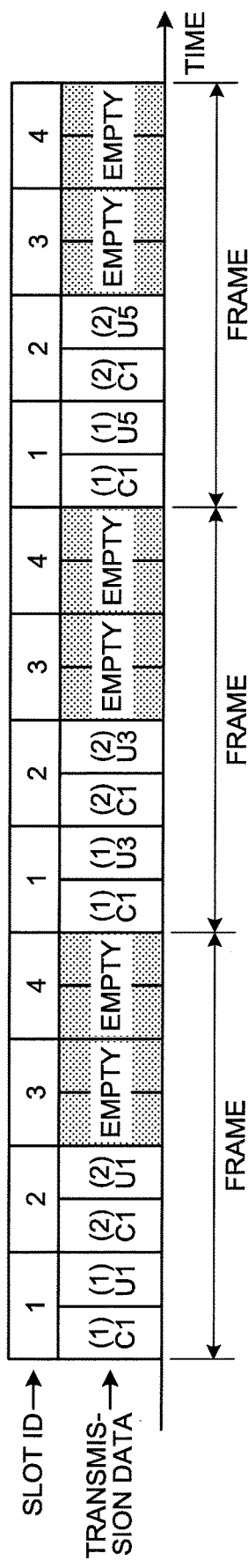
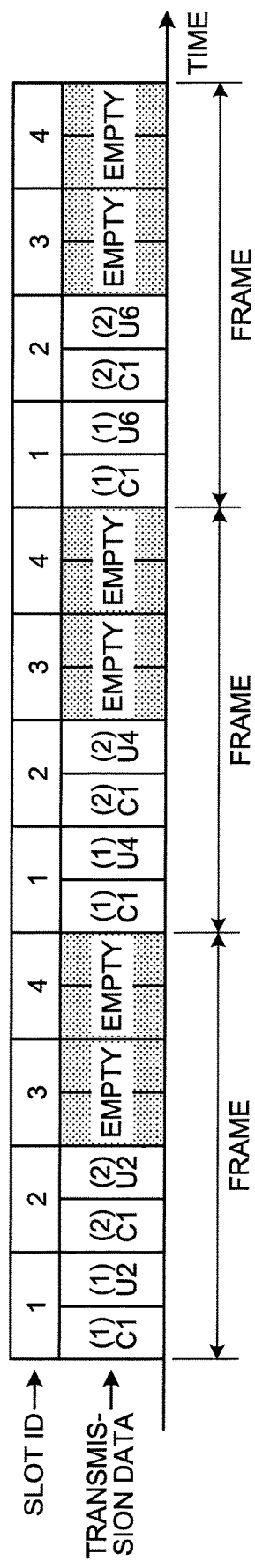

TRAIN CONTROL SYSTEM, BASE-STATION CONTROL DEVICE, GROUND WIRELESS BASE STATION, AND ON-VEHICLE WIRELESS STATION

FIELD

The present invention relates to a train control system for controlling a train by performing wireless communication between a ground wireless base station and an on-vehicle wireless station and also relates to a base-station control device, a ground wireless base station, and an on-vehicle wireless station that are included in the train control system.

BACKGROUND

In recent years, the introduction of a train control system that uses radio communication called "communication based train control" (CBTC) has been ongoing. Although the wireless communication scheme is not prescribed for CBTC, systems using 2.4-GHz band radio communication are mainstream. The 2.4-GHz band radio communication is exemplified in IEEE 802.11b/g. The 2.4-GHz band is also referred to as an "ISM (Industry Science Medical) band", and it has been used for short range wireless communication systems that have been rapidly coming into widespread use in recent years and has also been used in many devices, such as a microwave ovens. Examples of short range wireless communication systems include wireless communication systems using IEEE 802.11b,g, Bluetooth (registered trademark), and Zigbee (registered trademark).

In the ISM band, the areas where devices are used is not restricted; therefore, there is a problem in that the radio waves from a plurality of apparatuses interfere with each other and thus the communication quality of a wireless communication system deteriorates. Accordingly, in order to realize wireless communication with high quality in a train wireless system that uses an ISM band, a technology is indispensable that suppresses deterioration in communication quality caused by interfering radio waves from other devices. For example, a train wireless communication system disclosed in Patent Literature 1 is configured such that, on the basis of a channel search result, the terminal mounted on the fore side car of a train and the terminal mounted on the rear side car of the train select, from among the frequency channels having a reception intensity equal to or higher than a threshold, frequency channels different from each other. This configuration enables wireless communication to continue even if one of the channels is subjected to interference.

CITATION LIST

Patent Literature

Patent Literature 1: Japanese Patent Application Laid-open No. 2009-225135

SUMMARY

Technical Problem

With the above conventional technology disclosed in Patent Literature 1, the channels are selected on the basis of the reception intensity measurement result obtained at a point in time when base stations are switched; however, the position of the on-vehicle wireless station is different when the reception intensity is measured and when communication is actually performed. Further, this technology cannot address deterioration in terms of time and frequency, including interference from another device using a nearby frequency band. Thus, there is a problem in that this technology cannot cope with the reception intensity when communication is actually performed.

The present invention has been made in view of the above, and an object of the present invention is to provide a train control system that can improve the arrival rate of communication data used for train control between a ground wireless base station and an on-vehicle wireless station.

Solution to Problem

There is provided a train control system according to an aspect of the present invention for controlling an operation of a train by transmitting and receiving, between an on-vehicle wireless station mounted on the train and a ground wireless base station, information that includes train control information by wireless communication, the train control information being information for controlling an operation of the train, wherein general transmission information is transmitted only once from the ground wireless base station to the on-vehicle wireless station, the general transmission information being information included in the information that includes the train control information and that is transmitted by the ground wireless base station and being information other than the train control information, transmission of the train control information is repeated a plurality of times from the ground wireless base station to the on-vehicle wireless station, and among the repeatedly transmitted train control information, the on-vehicle wireless station uses, for an operation of the train, a piece of train control information, which the on-vehicle wireless station receives without lack of data for a first time.

Advantageous Effects of Invention

According to the present invention, an effect is obtained where it is possible to improve the arrival rate of communication data used for train control between a ground wireless base station and an on-vehicle wireless station.

BRIEF DESCRIPTION OF DRAWINGS

FIG. 4 is a diagram illustrating an example of information about wireless resources managed by a ground wireless base station according to a second embodiment.

FIG. 8 is a diagram illustrating, according to the fourth embodiment, an example of the state of allocation of wireless resources performed by ground wireless base stations in a case where each wireless resource is time.

FIG. 9 is a diagram illustrating, according to the fourth embodiment, an example of the state of allocation of wireless resources performed by the ground wireless base stations in a case where each wireless resource is time.

DESCRIPTION OF EMBODIMENTS

Exemplary embodiments of a train control system, a base-station control device, a ground wireless base station, and an on-vehicle wireless station according to the present invention will be explained below in detail with reference to the accompanying drawings. The present invention is not limited to the following embodiments.

First Embodiment

Figure 1:
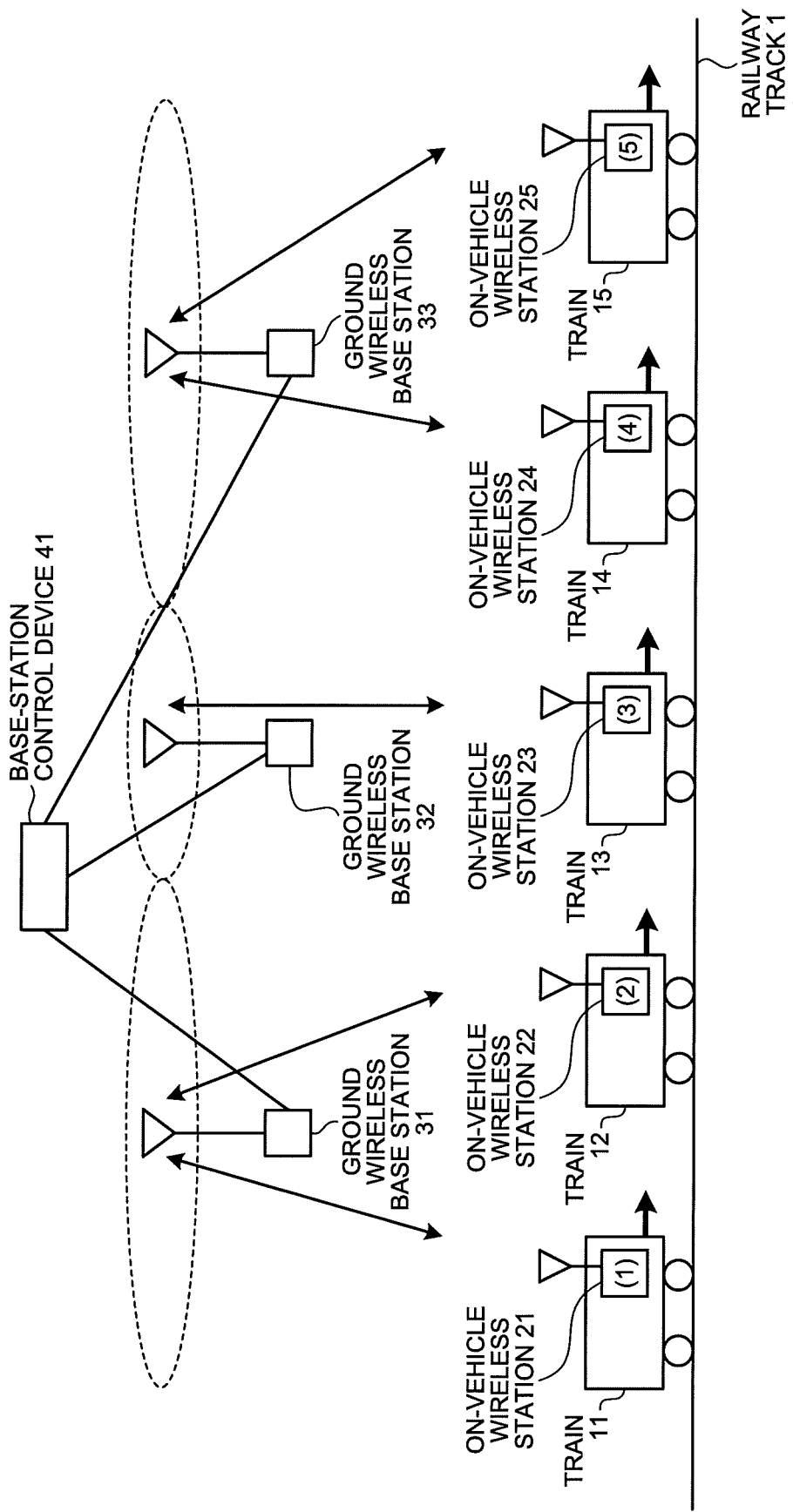
FIG. 1 is a diagram illustrating an example configuration of a train wireless communication system according to a first embodiment.

FIG. 1 is a diagram illustrating an example configuration of a train wireless communication system according to a first embodiment of the present invention. When the focus is on a train 11, the train wireless communication system illustrated in FIG. 1 is a train control system for controlling an operation of the train 11 by wirelessly transmitting and receiving information that includes train control information, which is information for controlling an operation of the train 11, between an on-vehicle wireless station 21 mounted on the train 11 and a ground wireless base station 31. The ground wireless base station 31 transmits general transmission information U1 only once to one on-vehicle wireless station 21. The general transmission information U1 is information other than the train control information and is information included in the information that includes the train control information C1 and that is transmitted by the ground wireless base station 31. The transmission of the train control information C1 is repeated a plurality of times from the ground wireless base station 31 to one on-vehicle wireless station 21. Among the pieces of the train control information C1 transmitted a plurality of times, the on-vehicle wireless station 21 uses, for an operation of the train 11, a piece of the train control information C1 that the on-vehicle wireless station 21 received without lack of data for the first time. In FIG. 1, trains 11, 12, 13, 14, and 15 are present on a railway track 1. Here, the train 11 includes the on-vehicle wireless station 21 connected to an antenna, the train 12 includes an on-vehicle wireless station 22 connected to an antenna, the train 13 includes an on-vehicle wireless station 23 connected to an antenna, the train 14 includes an on-vehicle wireless station 24 connected to an antenna, and the train 15 includes an on-vehicle wireless station 25 connected to an antenna. Each of the on-vehicle wireless stations 21, 22, 23, 24, and 25 is connected to an on-vehicle control device or an on-vehicle device (not shown).

Here, in FIG. 1, each train is equipped with one on-vehicle wireless station; however, the present invention is not limited to this. One train may be equipped with a plurality of on-vehicle wireless stations. Further, in FIG. 1, the on-vehicle wireless station is arranged on the fore side of each train; however, the present invention is not limited to this. In the present invention, the installation position of the on-vehicle wireless station is not specifically limited. The on-vehicle wireless station may be arranged on the fore side of each train, may be arranged on the rear side of each train, or may be arranged on both of the fore and rear sides of each train.

Ground wireless base stations 31, 32, and 33 are arranged on the ground so as to form continuous wireless communication areas along the railway track 1, and they perform wireless communication with the on-vehicle wireless stations 21, 22, 23, 24, and 25. Data transmitted and received by wireless communication between the ground wireless base stations 31, 32, and 33 and the on-vehicle wireless stations 21, 22, 23, 24, and 25 is roughly classified into train control information, which is periodically renewed and requires high communication quality, and general transmission information, which is generated regularly or irregularly. Here, the train control information is information used for controlling traveling of the trains, such as brake command information, and can be exemplified by train traveling position information, speed information, train travel permission position information, and speed limit information. The general transmission information is information that is not included in the train control information and can be exemplified by air conditioning temperature information, in-vehicle display information, and in-vehicle illumination lighting information.

As illustrated in FIG. 1, the trains 11 and 12 are present in the communication area of the ground wireless base station 31, and the ground wireless base station 31 is performing wireless communication with the on-vehicle wireless stations 21 and 22. Similarly, the train 13 is present in the communication area of the ground wireless base station 32, and the ground wireless base station 32 is performing wireless communication with the on-vehicle wireless station 23. Further, the trains 14 and 15 are present in the communication area of the ground wireless base station 33, and the ground wireless base station 33 is performing wireless communication with the on-vehicle wireless stations 24 and 25.

The ground wireless base stations 31, 32, and 33 are connected to a base-station control device 41, and the base-station control device 41 provides overall control of the ground wireless base stations 31, 32, and 33. Here, in FIG. 1, the ground wireless base stations 31, 32, and 33 are connected by a cable to the base-station control device 41; however, the present invention is not limited to this. The ground wireless base stations 31, 32, and 33 may perform wireless communication with the base-station control device 41. Each of the ground wireless base stations 31, 32, and 33 realizes wireless communication by allocating a frequency or time, serving as a wireless resource that can be used by a corresponding ground wireless base station, to an on-vehicle wireless station that is performing communication inside the communication area covered by the corresponding ground wireless base station.

Figure 2:
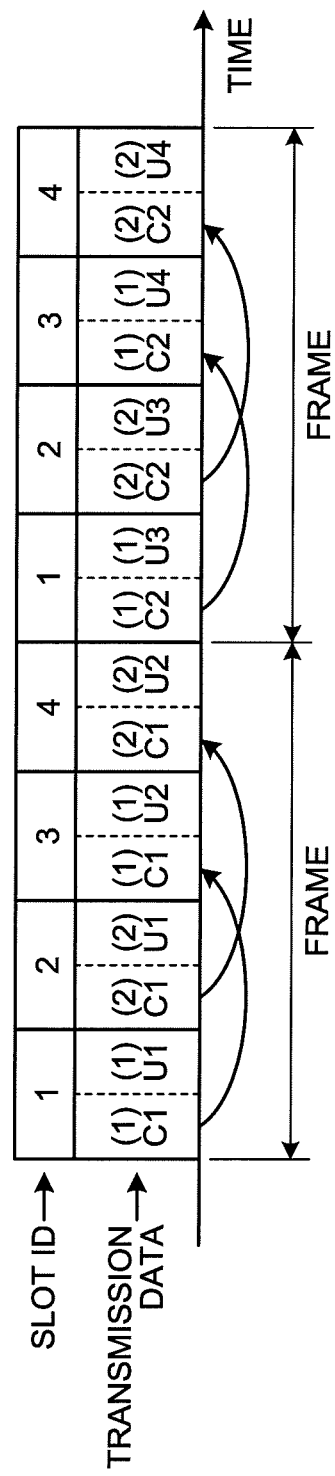
FIG. 2 is a diagram illustrating, according to the first embodiment, an example of the state of allocation of wireless resources performed by a ground wireless base station in a case where each wireless resource is time.

FIG. 2 is a diagram illustrating, according to the first embodiment, an example of the state of allocation of wireless resources performed by the ground wireless base station 31 in a case where each wireless resource is time. Specifically, as illustrated in FIG. 2, the on-vehicle wireless stations 21 and 22 and the ground wireless base station 31 perform wireless communication with each other by using a time division multiplexing (TDM: Time Division Multiplexing) scheme. The frame is a period in which the train control information is renewed. As illustrated in FIG. 2, the ground wireless base station 31 allocates time slots to the on-vehicle wireless stations 21 and 22. The time slots allocated to the on-vehicle wireless station 21 are denoted by a numeral "1" in parentheses, and the time slots allocated to the on-vehicle wireless station 22 are denoted by a numeral "2" in parentheses. Here, slots ID 1 and ID 3 are allocated to the on-vehicle wireless station 21, and slots ID 2 and ID 4 are allocated to the on-vehicle wireless station 22. The data transmitted and received by wireless communication between the on-vehicle wireless stations 21 and 22 and the ground wireless base station 31 is roughly classified into train control information C1 and C2 and general transmission information U1, U2, U3, and U4. The ground wireless base station 31 transmits the general transmission information to each on-vehicle wireless station only once in each frame, and transmits the train control information to each on-vehicle wireless station repeatedly twice in each frame. In this way, the general transmission information is transmitted only once and the train control information is transmitted repeatedly; therefore, the general transmission information can be transmitted and received efficiently and the communication data arrival rate of the train control information can be improved. Here, in FIG. 2, the number of repetitions of data transmission is set to two; however, the present invention is not limited to this. The number of repetitions may be set to three or more.

Further, time is used as each wireless resource and the time slots are allocated in FIG. 2; however, the present invention is not limited to this. Each wireless resource may be a frequency and frequency slots may be allocated. Further, the train control information and the general transmission information in each slot are transmitted separately in time or frequency. As described above, time slots divided in time and/or frequency slots divided in frequency can be used in each slot. Accordingly, time slots may be used and each slot may be divided in time, time slots may be used and each slot may be divided in frequency, frequency slots may be used and each slot may be divided in time, or frequency slots may be used and each slot may be divided in frequency.

Note that, when the encoding rates of the train control information and the general transmission information in each slot are set to be different from each other and the encoding rate of the train control information is set to be lower than the encoding rate of the general transmission information to increase the redundancy of the train control information, it becomes possible to enhance the resistance of the train control information against poor reception.

Here, in FIG. 2, the number of slots is four; however, the present invention is not limited to this. The number of slots is the same among the ground wireless base stations 31, 32, and 33.

Figure 3:
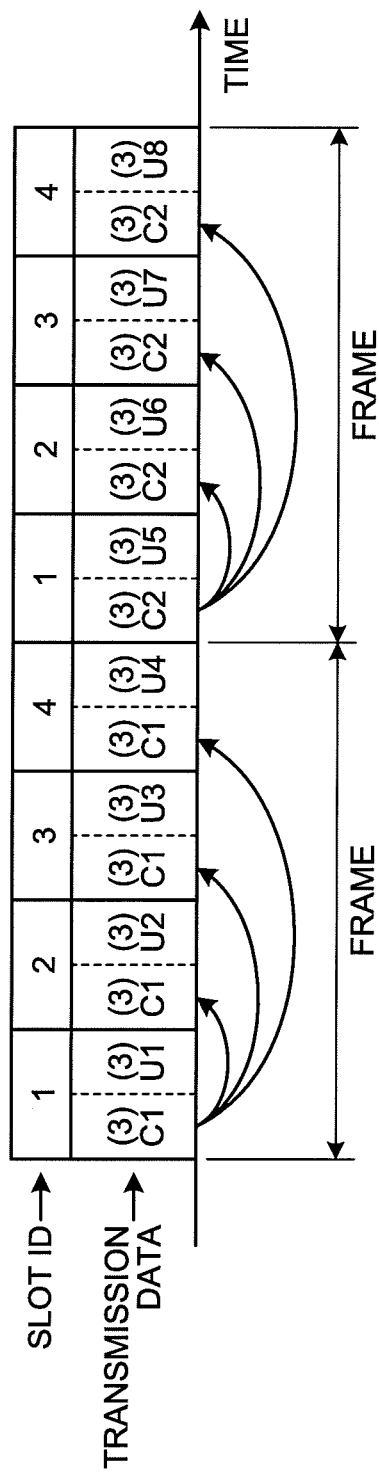
FIG. 3 is a diagram illustrating, according to the first embodiment, an example of the state of allocation of wireless resources performed by a ground wireless base station in a case where each wireless resource is time.

FIG. 3 is a diagram illustrating, according to the first embodiment, an example of the state of allocation of wireless resources performed by the ground wireless base station 32 in a case where each wireless resource is time. As illustrated in FIG. 3, the ground wireless base station 32 allocates time slots to the on-vehicle wireless station 23. The time slots allocated to the on-vehicle wireless station 23 are denoted by a numeral "3" in parentheses. Similarly to the example illustrated in FIG. 2, the data transmitted and received by wireless communication between the on-vehicle wireless station 23 and the ground wireless base station 32 is roughly classified into train control information C1 and C2, which is periodically renewed and requires high communication quality, and general transmission information U1, U2, U3, U4, U5, U6, U7, and U8. The ground wireless base station 32 transmits the general transmission information to the on-vehicle wireless station only once in each frame and transmits the train control information to the same on-vehicle wireless station repeatedly four times in each frame. In this way, the general transmission information is transmitted only once and the train control information is transmitted repeatedly; therefore, the general transmission information can be transmitted and received efficiently and the communication data arrival rate of the train control information can be improved.

Next, a description will be given of an operation for repeatedly transmitting data as described above. The base-station control device 41 stores therein a number-of-transmissions setting table for managing the number of repetitions of transmission for the train control information, and transmits the number of repetitions of transmission, as base station control information, to each of the ground wireless base stations 31, 32, and 33. The number-of-transmissions setting table may be created by automatic calculation on the basis of the extent of the communication area, the result of measurement of interference waves, or the communication data arrival rate of each ground wireless base station, or may be created by manual setting. Each of the ground wireless base stations 31, 32, and 33 receives the base station control information from the base-station control device 41, and allocates time slots such that the number of repetitions of transmission for the train control information from a corresponding ground wireless base station complies with the base station control information. After allocating time slots as described above, each ground wireless base station successively transmits the train control information in accordance with the number of repetitions of transmission. As a result, as illustrated in FIG. 3, regarding each of the pieces of the train control information C1 and C2, transmission of an identical piece of data is repeated four times in each frame, and regarding each of the pieces of the general transmission information U1, U2, U3, U4, U5, U6, U7, and U8, identical data is not repeatedly transmitted and new data is transmitted one after another. It is sufficient if each on-vehicle wireless station receives any one of the pieces of the identical train control information that are repeatedly transmitted. Each on-vehicle wireless station treats data that is received correctly for the first time as effective valid reception data, and discards the other redundant reception data.

According to the first embodiment described above, each ground wireless base station does not repeatedly transmit identical data. On the other hand, each ground wireless base station repeatedly transmits identical data. Thus, the communication data arrival rate can be improved.

Further, according to the first embodiment, because surplus wireless resources are effectively utilized, the capacity for transmitting the general transmission information can be increased.

Further, according to the first embodiment, it is possible to process data faster than in the case when retransmission control is performed, in which a lack of reception data is detected and thereafter identical data is retransmitted.

Further, according to the first embodiment, as compared with a case where identical data is transmitted by a plurality of wireless devices, the equipment is less complicated; therefore, each of the ground wireless base stations and the on-vehicle wireless stations can be downsized.

Second Embodiment

In the first embodiment, the base-station control device 41 stores therein the number-of-transmissions setting table for managing the number of repetitions of transmission of the train control information, and the number of repetitions of transmission is specified in advance as the base station control information; however, the present invention is not limited to this. In the second embodiment, an explanation will be given of a mode where each of the ground wireless base stations 31, 32, and 33 detects an empty slot, in which a wireless resource is idle, and determines the number of repetitions of transmission in accordance with the empty slot.

First, the ground wireless base stations 31, 32, and 33 manage information on the wireless resources allocated to the on-vehicle wireless stations 21, 22, 23, 24, and 25 in their own communication areas. FIG. 4 is a diagram illustrating an example of information on the wireless resources managed by the ground wireless base station 31 according to the second embodiment. FIG. 4 illustrates an example where the ground wireless base station 31 allocates the wireless resource ID=1 to the on-vehicle wireless station 21 and allocates the wireless resource ID=2 to the on-vehicle wireless station 22 whereas the wireless resource ID=3 and the wireless resource ID=4 are not allocated to any of the on-vehicle wireless stations, i.e., these resources are unallocated.

Figure 5:
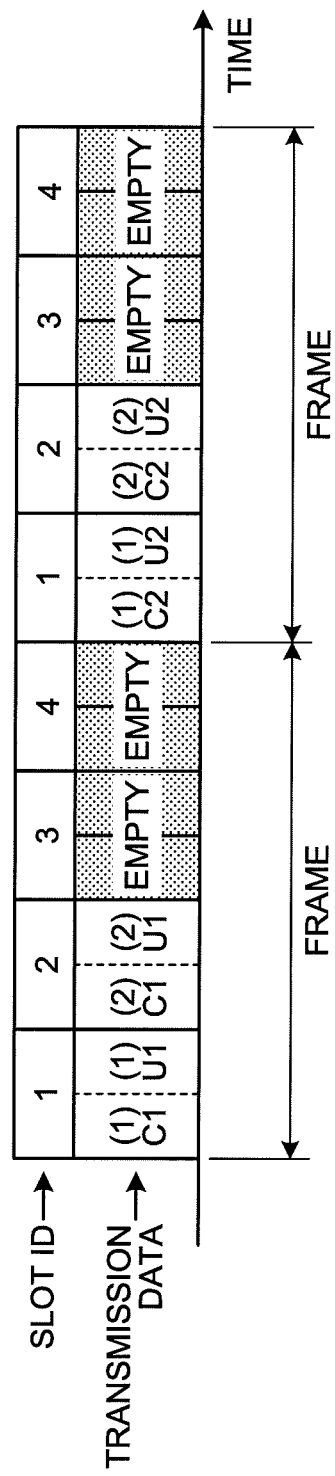
FIG. 5 is a diagram illustrating, according to the second embodiment, an example of the state of allocation of wireless resources performed by the ground wireless base station in a case where each wireless resource is time.

FIG. 5 is a diagram illustrating, according to the second embodiment, an example of the state of allocation of wireless resources performed by the ground wireless base station 31 in a case where each wireless resource is time. First, the ground wireless base station 31 monitors an idle state of wireless resources at any time, and, when detecting an empty slot, fills the empty slot by allocating the wireless resource to an on-vehicle wireless station. Specifically, the idle wireless resource ID=3 is allocated to the on-vehicle wireless station 21 and the idle wireless resource ID=4 is allocated to the on-vehicle wireless station 22. By performing allocation in such a manner, the state of allocation of wireless resources performed by the ground wireless base station 31 becomes the same as that illustrated in FIG. 2 described in the first embodiment, i.e., the empty slots can be filled.

According to the second embodiment described above, it is possible to provide the same effect as that of the first embodiment. Further, it is possible to detect an empty slot and fill the empty slot; therefore, the communication efficiency can be improved.

Third Embodiment

In the first and second embodiments, an explanation has been given of a case where the train control information and the general transmission information are transmitted, whereby the train operation is being performed without any problems. However, during the train operation, there may be a case where the emergency brakes need to be applied. In this case, it is necessary to transmit emergency information to an on-vehicle wireless station in preference to the train control information.

Figure 6:
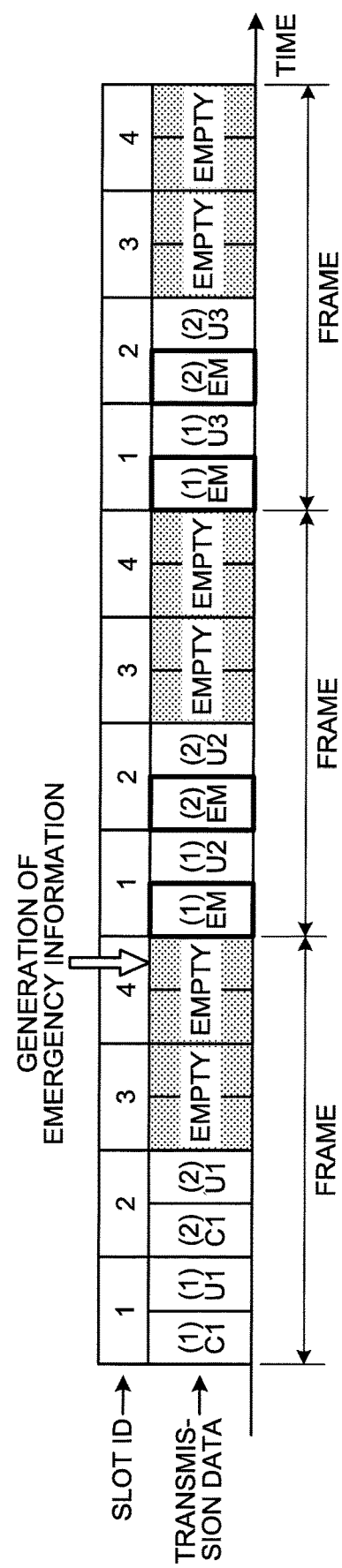
FIG. 6 is a diagram illustrating, according to a third embodiment, an example of the state of allocation of wireless resources performed by a ground wireless base station in a case where each wireless resource is time.

FIG. 6 is a diagram illustrating, according to a third embodiment, an example of the state of allocation of wireless resources performed by the ground wireless base station 31 in a case where each wireless resource is time. As illustrated in FIG. 6, when emergency information EM is generated, the train control information is replaced by the emergency information EM and then the emergency information EM is transmitted. With this control, the emergency information can be reflected in the train control.

Here, in FIG. 6, the train control information is replaced by the emergency information EM and then the emergency information EM is transmitted; however, the train control information and the general transmission information may be replaced by the emergency information EM and then the emergency information EM may be transmitted. Further, empty slots are not utilized in FIG. 6; however, an empty slot may be detected as in the second embodiment and the emergency information EM may also be transmitted using the empty slot. As described above, by replacing both of the train control information and the general transmission information with the emergency information EM and transmitting the emergency information EM or by utilizing an empty slot, it is possible to swiftly reflect the emergency information to the train operation.

Fourth Embodiment

In the first, second, and third embodiments, explanations have been given of cases where each train is equipped with only one on-vehicle wireless station. However, as suggested in the first embodiment, the present invention is not limited to this. One train may be equipped with a plurality of on-vehicle wireless stations.

Figure 7:
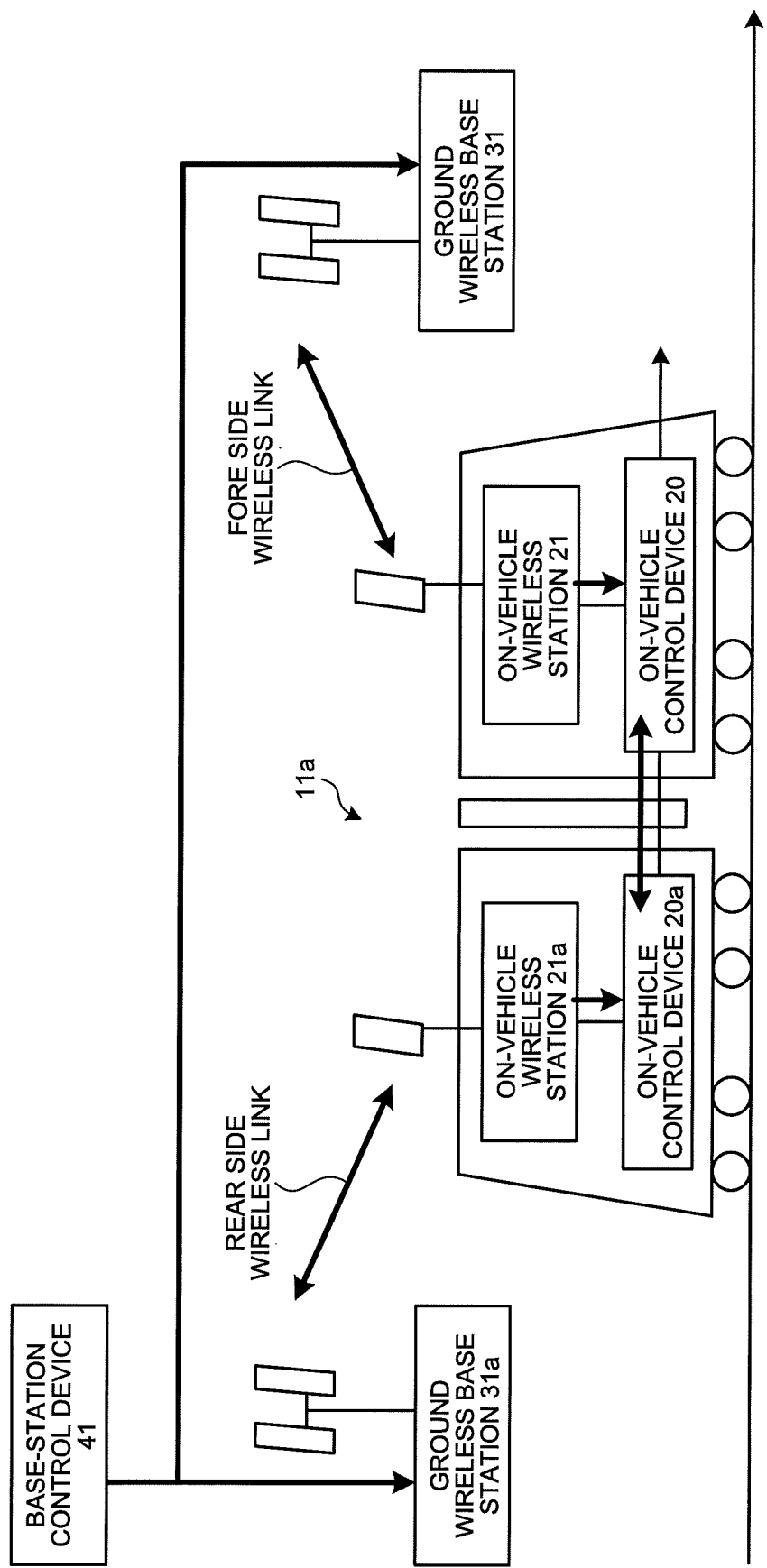
FIG. 7 is a diagram illustrating an example configuration of a train wireless communication system according to a fourth embodiment.

FIG. 7 is a diagram illustrating an example configuration of a train wireless communication system according to a fourth embodiment of the present invention. As illustrated in FIG. 7, a train 11*a* includes an on-vehicle wireless station 21 on the foremost side car and an on-vehicle wireless station 21*a* on the rearmost side car. Ground wireless base stations 31 and 31*a* are arranged on the ground and are connected to the base-station control device 41. The on-vehicle wireless station 21 performs wireless communication with the ground wireless base station 31 via a fore side wireless link, and the on-vehicle wireless station 21*a* performs wireless communication with the ground wireless base station 31*a* via a rear side wireless link. The on-vehicle wireless station 21 is connected to an on-vehicle control device 20 and the on-vehicle wireless station 21*a* is connected to an on-vehicle control device 20*a*. The on-vehicle control device 20 and the on-vehicle control device 20a are connected to each other by a communication line, and they check the received pieces of data against each other.

FIG. 8 is a diagram illustrating, according to the fourth embodiment, an example of the state of allocation of wireless resources performed by the ground wireless base stations 31 and 31a in a case where each wireless resource is time. FIG. 8(A) illustrates the state of allocation of wireless resources performed by the ground wireless base station 31, which performs wireless communication with the on-vehicle wireless station 21 via the fore side wireless link. FIG. 8(B) illustrates the state of allocation of wireless resources performed by the ground wireless base station 31a, which performs wireless communication with the on-vehicle wireless station 21a via the rear side wireless link. As illustrated in FIG. 8, because the fore side wireless link and the rear side wireless link are both used to transmit identical data and receive identical data, it is possible to further improve the communication data arrival rate in transmission and reception.

However, the train wireless communication system according to the fourth embodiment is not limited to a mode where the fore side wireless link and the rear side wireless link are both used to transmit identical data and receive identical data. FIG. 9 is a diagram illustrating, according to the fourth embodiment, an example of the state of allocation of wireless resources performed by the ground wireless base stations 31 and 31a in a case where each wireless resource is time. FIG. 9(A) illustrates the state of allocation of wireless resources performed by the ground wireless base station 31, which performs wireless communication with the on-vehicle wireless station 21 via the fore side wireless link. FIG. 9(B) illustrates the state of allocation of wireless resources performed by the ground wireless base station 31a, which performs wireless communication with the on-vehicle wireless station 21a via the rear side wireless link. As illustrated in FIG. 9, when the fore side wireless link and the rear side wireless link can be used to transmit and receive different pieces of data so that each of the fore side wireless link and the rear side wireless link takes charge of transmission/reception of a different part of the general transmission information, the capacity for transmission/reception data can be increased. Specifically, the comparison of FIG. 9 with FIG. 8 shows that twice as much as the general transmission information can be transmitted in FIG. 9 than in FIG. 8.

Note that, in the train 11a illustrated in FIG. 7, if the on-vehicle wireless station 21 has failed, an empty slot in the rear side wireless link for wireless communication between the on-vehicle wireless station 21a and the ground wireless base station 31a may be utilized to increase the number of repetitions of transmission. If the on-vehicle wireless station 21a has failed, an empty slot in the fore side wireless link for wireless communication between the on-vehicle wireless station 21 and the ground wireless base station 31 may be utilized to increase the number of repetitions of transmission.

Fifth Embodiment

Figure 10:
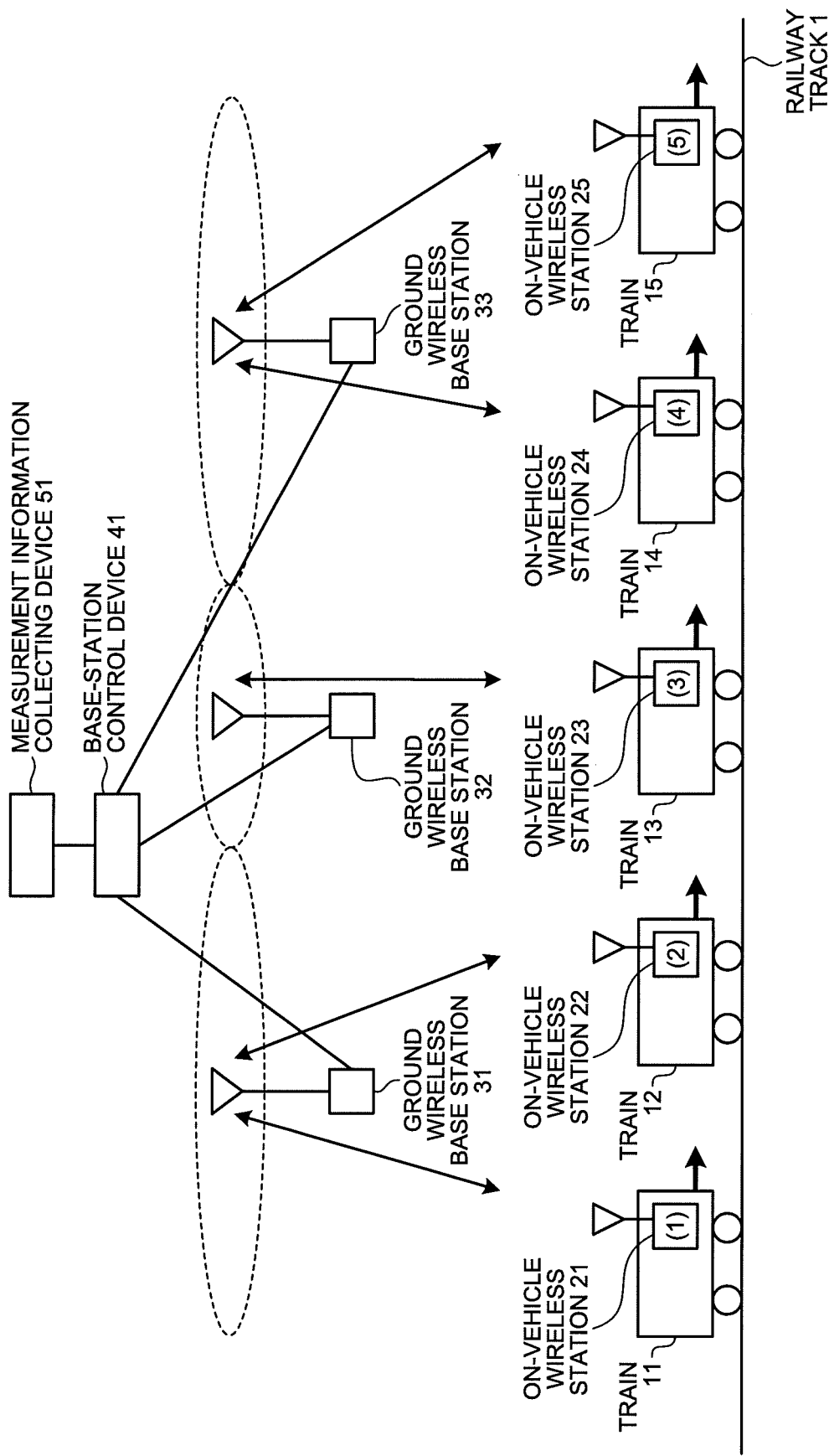
FIG. 10 is a diagram illustrating an example configuration of a train wireless communication system according to a fifth embodiment.

FIG. 10 is a diagram illustrating an example configuration of a train wireless communication system according to a fifth embodiment of the present invention. The train wireless communication system illustrated in FIG. 10 differs from the train wireless communication system illustrated in FIG. 1 in that a measurement information collecting device 51 is connected to the base-station control device 41; however, the other configurations are same as those of FIG. 1.

Figure 11:
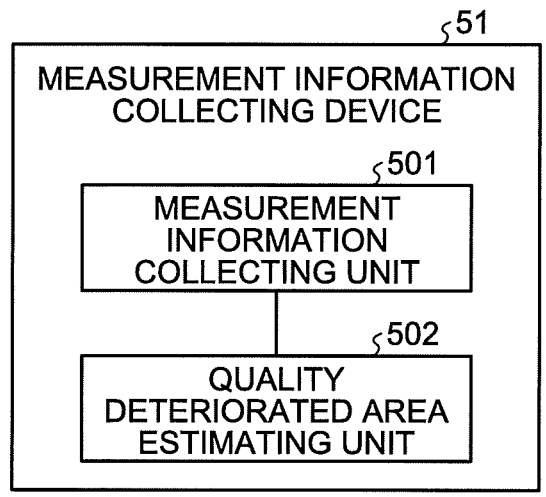
FIG. 11 is a diagram illustrating an example configuration of a measurement information collecting device according to the fifth embodiment.

FIG. 11 is a diagram illustrating an example configuration of the measurement information collecting device 51 according to the fifth embodiment. As illustrated in FIG. 11, the measurement information collecting device 51 includes a measurement information collecting unit 501 that collects and accumulates communication quality measurement results; and a quality deterioration area estimating unit 502 that specifies, in accordance with the communication quality measurement results accumulated in the measurement information collecting unit 501, an area in which the communication quality deteriorates, and instructs the base-station control device 41 to increase the number of repetitions of transmission for the specified area.

Figure 12:
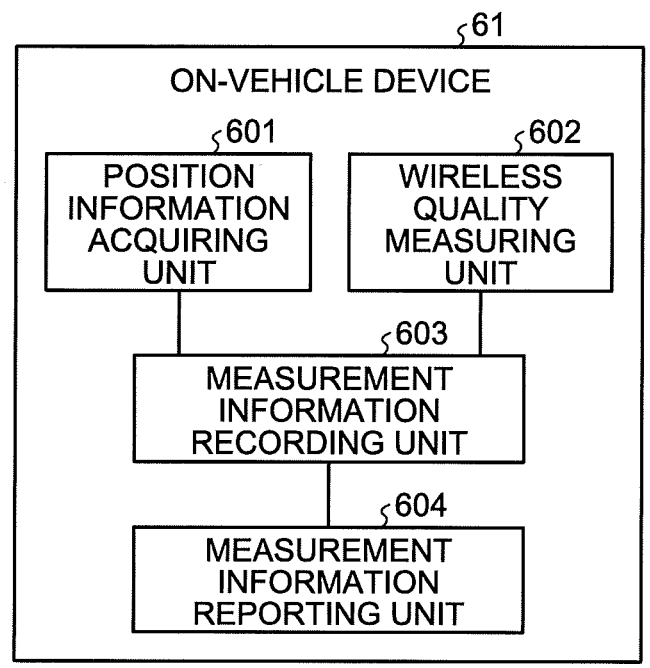
FIG. 12 is a diagram illustrating, according to the fifth embodiment, an example configuration of an on-vehicle device with which each train is equipped.

FIG. 12 is a diagram illustrating an example configuration of an on-vehicle device 61 with which each train is equipped according to the fifth embodiment. As illustrated in FIG. 12, the on-vehicle device 61 includes a position information acquiring unit 601 that acquires position information on the train; a wireless quality measuring unit 602 that measures the communication quality with a corresponding ground wireless base station; a measurement information recording unit 603 that records pieces of the position information acquired by the position information acquiring unit 601 and the communication quality measurement results in association with each other; and a measurement information reporting unit 604 that transmits position information and the communication quality measurement result associated therewith, which have been recorded in the measurement information recording unit 603, to a ground wireless base station via an on-vehicle wireless station. The position information and the communication quality measurement result associated therewith, which have been transmitted to the ground wireless base station, are transmitted to the base-station control device 41.

Figure 13:
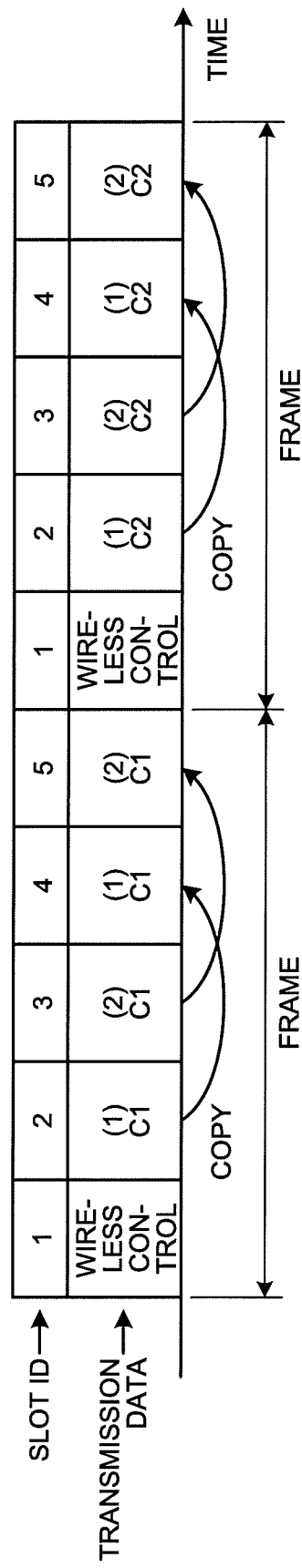
FIG. 13 is a diagram illustrating, according to the fifth embodiment, an example of the state of allocation of wireless resources performed by a ground wireless base station in a case where each wireless resource is time.

FIG. 13 is a diagram illustrating, according to the fifth embodiment, an example of the state of allocation of wireless resources performed by the ground wireless base station 31 in a case where each wireless resource is time. As illustrated in FIG. 13, similarly to FIG. 2, the time slots allocated to the on-vehicle wireless station 21 are denoted by a numeral "1" in parentheses and the time slots allocated to the on-vehicle wireless station 22 are denoted by a numeral "2" in parentheses.

The ground wireless base station 31 transmits the train control information a plurality of times in each frame. In FIG. 13, identical train control information is repeatedly transmitted twice to the on-vehicle wireless station 21 and twice to on-vehicle wireless station 22. When communication is performed, the ground wireless base station 31 collects the communication error rate in transmitting and receiving the train control information with respect to the on-vehicle wireless station 21 or on-vehicle wireless station 22, and transmits the collected communication error rate to the measurement information collecting device 51. When communication is not performed, the ground wireless base station 31 measures the reception level of interference signals and transmits the communication quality measurement result to the measurement information collecting device 51. The communication quality measurement result is transmitted to the base-station control device 41 every predetermined period and is accumulated in the measurement information collecting device 51. Similarly, each of the ground wireless base stations 32 and 33 also transmits the communication quality measurement result to the base-station control device 41.

Figure 14:
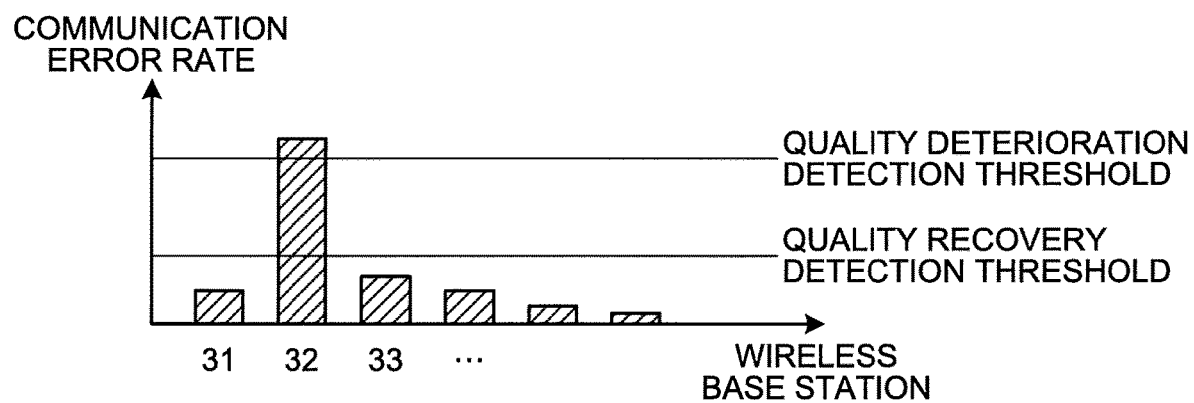
FIG. 14 is a diagram illustrating the communication quality measurement results collected by ground wireless base stations according to the fifth embodiment.

FIG. 14 is a diagram illustrating the communication quality measurement results collected by the ground wireless base stations according to the fifth embodiment. Upon acquiring the communication quality measurement result from each of the ground wireless base stations, the base-station control device 41 compares one or both of the communication error rate and the interference signal reception level with a predetermined quality deterioration detection threshold, and specifies and extracts a wireless base station with low communication quality. In FIG. 14, each of the communication error rates is compared with a quality deterioration detection threshold and the ground wireless base station 32 is specified and extracted as a wireless base station with a high communication error rate.

Here, in FIG. 14, the quality deterioration detection threshold is valid only when the communication error rate is rising, and a quality recovery detection threshold is valid only when the communication error rate is falling. Specifically, when the communication error rate rises and exceeds the quality deterioration detection threshold, it is determined that the communication quality has deteriorated. Thereafter, even when the communication error rate falls and becomes lower than the quality deterioration detection threshold, the determination that the communication quality is in a deteriorated state is maintained. Then, when the communication error rate further falls and becomes lower than the quality recovery detection threshold, it is determined that the communication quality has been recovered. In contrast, even when the communication error rate rises and exceeds the quality recovery detection threshold, it is not determined that the communication quality has deteriorated. Thereafter, when the communication error rate further rises and exceeds the quality deterioration detection threshold, it is determined that the communication quality has deteriorated.

Then, the base-station control device 41 transmits a command to increase the number of repetitions of transmission to the ground wireless base station 32 thus extracted. In the present embodiment, the number of repetitions of transmission to be increased is not specifically limited. For example, it may be set such that identical train control information is transmitted three times in each frame. It is sufficient if the on-vehicle wireless station 21 correctly receives any one of the pieces of the identical train control information repeatedly transmitted, and the on-vehicle wireless station 21 treats the data that is received correctly for the first time as valid reception data and discards the other data.

Here, the ground wireless base station 31 has notified the on-vehicle wireless station 21 present in its own communication area of the wireless control information. Changing the number of repetitions of transmission causes a difference in the number of repetitions of transmission between the ground wireless base stations. In such a case, the on-vehicle wireless station acquires wireless control information while performing handover for switching wireless base stations along with its travel, so that the on-vehicle wireless station can acquire the number of repetitions of transmission in this area and specify the time slots. In FIG. 13, "wireless control" transmitted in the slot ID="1" is the wireless control information.

On the other hand, with respect to wireless base stations for which the base-station control device 41 has increased the number of repetitions of transmission from a default value in accordance with the communication quality measurement results acquired from the wireless base stations, the base-station control device 41 compares the communication error rate or interference signal level with the predetermined quality recovery detection threshold at any time, to extract a wireless base station whose communication quality has been recovered. Then, the base-station control device 41 transmits, to the ground wireless base station thus extracted, a command to reduce the number of repetitions of transmission back to the default value.

Figure 15:
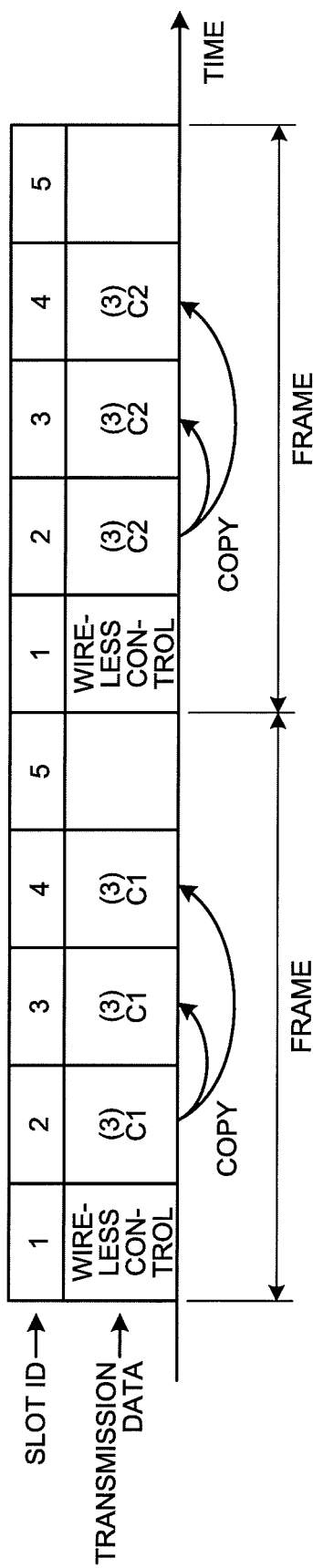
FIG. 15 is a diagram illustrating, according to the fifth embodiment, an example of the state of allocation of wireless resources performed by a ground wireless base station in a case where each wireless resource is time.

FIG. 15 is a diagram illustrating, according to the fifth embodiment, an example of the state of allocation of wireless resources performed by the ground wireless base station 32 in a case where each wireless resource is time.

Figure 16:
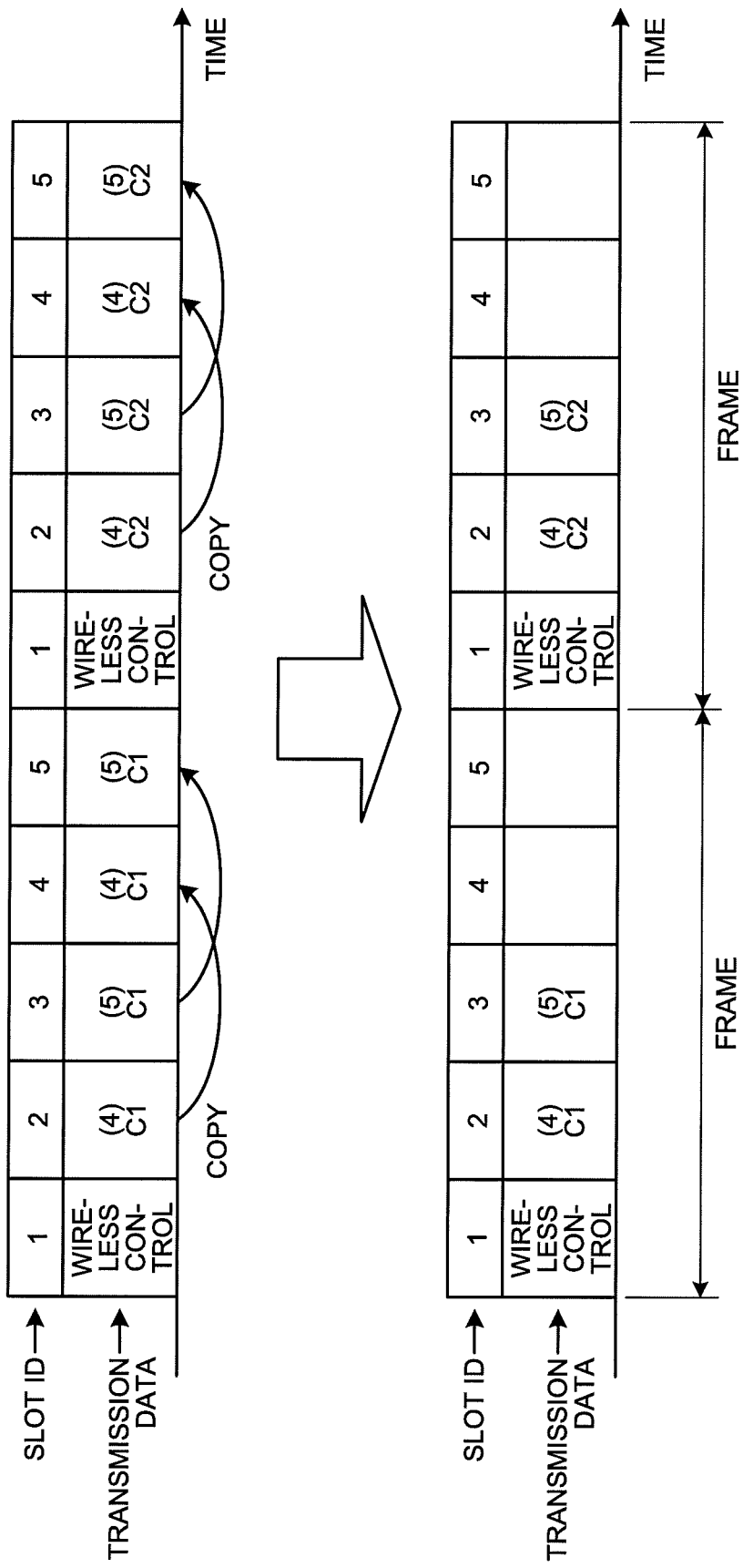
FIG. 16 is a diagram illustrating, according to the fifth embodiment, an example of the state of allocation of wireless resources performed by a ground wireless base station in a case where each wireless resource is time.

FIG. 16 is a diagram illustrating, according to the fifth embodiment, an example of the state of allocation of wireless resources performed by the ground wireless base station 33 in a case where each wireless resource is time. The time slots allocated to the on-vehicle wireless station 24 are denoted by a numeral "4" in parentheses, and the time slots allocated to the on-vehicle wireless station 25 are denoted by a numeral "5" in parentheses. As illustrated in FIG. 16, in the ground wireless base station 33, the number of repetitions of transmission is increased to two from the default value, i.e., one, by the previously performed process. However, because, as a result of the comparison of the communication quality measurement result and the quality recovery detection threshold, communication quality recovery is detected, the number of repetitions of transmission is reduced to one, i.e., it is returned to the default value.

According to the fifth embodiment described above, each ground wireless base station transmits identical data repeatedly in accordance with position information; therefore, the communication success rate can be improved even when part of the reception data is missing due to radio wave interference or momentary shielding.

Further, according to the scheme described in the fifth embodiment, each on-vehicle wireless station can improve the communication success rate without switching wireless base stations. Thus, the communication success rate can be improved without adding further wireless base stations.

Further, when the number of repetitions of transmission is increased, transmission is performed at temporally different timing. Thus, the communication environment may have become better because of the time shift and thus it is possible to reduce the communication error rate.

Further, an empty slot is utilized in order to increase the number of repetitions of transmission. Thus, the communication success rate can be improved without hindering the other communication.

Further, when the communication quality has been recovered, the number of repetitions of transmission is reduced back to the original number of times to increase empty slots and generate non-transmission time. Thus, power consumption for wireless communication between the ground wireless base stations and the on-vehicle wireless stations can be reduced.

Figure 17:
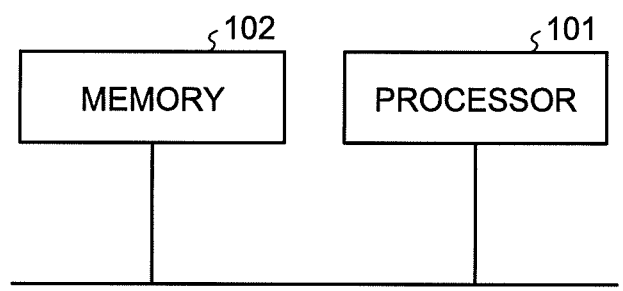
FIG. 17 is a diagram illustrating a general configuration of hardware for realizing each device provided in a train control system according to each of the first, second, third, fourth, and fifth embodiments.

It should be noted that, in the first, second, third, fourth, and fifth embodiments described above, each of the on-vehicle control devices 20 and 20a, the on-vehicle wireless stations 21, 21a, 22, 23, 24, and 25, the ground wireless base stations 31, 31a, 32, 33, 34, and 35, the base-station control device 41, the measurement information collecting device 51, and the on-vehicle device 61 may include at least a processor and a memory, and each operation of each of the devices can be realized by software. FIG. 17 illustrates a general configuration of hardware for realizing each of the devices. The device illustrated in FIG. 17 includes a processor 101 and a memory 102, where the processor 101 performs calculation and control on the basis of software by use of input data, and the memory 102 stores input data or data necessary for the processor 101 to perform calculation and control. Here, each of the devices may include a plurality of the processors 101 and a plurality of the memories 102.

The configurations illustrated in the above embodiments are mere examples of the present invention, and they may be combined with other known technologies. Further, the configurations may be partly omitted or changed without departing from the gist of the present invention.

Further, in the description of the above embodiments, an explanation has been given of a train control system; however, the present invention is not limited to this. The present invention should be construed to encompass a station control device, a ground wireless base station, and an on-vehicle wireless station that can be used in the train control system described in each of the above embodiments.

REFERENCE SIGNS LIST

11, 11a, 12, 13, 14, 15 train, 20, 20a on-vehicle control device, 21, 21a, 22, 23, 24, 25 on-vehicle wireless station, 31, 31a, 32, 33, 34, 35 ground wireless base station, 41 base-station control device, 51 measurement information collecting device, 61 on-vehicle device, 101 processor, 102 memory, 501 measurement information collecting unit, 502 quality deteriorated area estimating unit, 601 position information acquiring unit, 602 wireless quality measuring unit, 603 measurement information recording unit, 604 measurement information reporting unit.

The invention claimed is:

1. A train control system for controlling an operation of a train by transmitting and receiving, between an on-vehicle wireless station mounted on the train and a ground wireless base station, information that includes train control information by wireless communication, the train control information being information for controlling an operation of the train, wherein
the information that includes the train control information further includes general transmission information that is information other than the train control information,
the ground wireless base station includes a first processor to execute a first program and a first memory to store the first program which, when executed by the first processor, performs processes of
transmitting the general transmission information only once from the ground wireless base station to the on-vehicle wireless station,
transmitting the train control information repeatedly a plurality of times from the ground wireless base station to the on-vehicle wireless station, and
among the repeatedly transmitted train control information, the on-vehicle wireless station uses, for an operation of the train, a piece of train control information, which the on-vehicle wireless station receives without lack of data for a first time.

2. The train control system according to claim 1, wherein the wireless communication is performed by using time slots.

3. The train control system according to claim 2, wherein, when an empty slot is present among the time slots, the first processor of the ground wireless base station executes transmitting the train control information by using the empty slot to increase a number of repetitions of transmission of the train control information.

4. The train control system according to claim 1, wherein the wireless communication is performed by using frequency slots.

5. The train control system according to claim 4, wherein, when an empty slot is present among the frequency slots, the first processor of the ground wireless base station executes transmitting the train control information by using the empty slot to increase a number of repetitions of transmission of the train control information.

6. The train control system according to claim 1, wherein, when emergency information on an operation of the train is generated, the train control information is replaced by the emergency information and the emergency information is transmitted.

7. The train control system according to claim 1, wherein
a plurality of the on-vehicle wireless stations are arranged on the train,
a plurality of the ground wireless base stations are arranged, and
the plurality of on-vehicle wireless stations receive, from different ground wireless base stations among the ground wireless base stations, identical pieces of the train control information and identical pieces of the general transmission information.

8. The train control system according to claim 1, wherein
a plurality of the on-vehicle wireless stations are arranged on the train,
a plurality of the ground wireless base stations are arranged,
the plurality of on-vehicle wireless stations receive identical pieces of the train control information from different ground wireless base stations among the ground wireless base stations, and
the plurality of on-vehicle wireless stations receive different pieces of the general transmission information from different ground wireless base stations among the ground wireless base stations.

9. The train control system according to claim 1, wherein
the ground wireless base station is controlled by a base-station control device, and
a number of transmissions of the train control information is set by the base-station control device.

10. The train control system according to claim 9, wherein
a measurement information collecting device is connected to the base-station control device, and
the measurement information collecting device includes a second processor to execute a second program and a second memory to store the second program which, when executed by the second processor, performs processes of:
collecting and accumulating a communication quality measurement result; and
specifying an area in which a communication quality deteriorates in accordance with the communication quality measurement result accumulated, and
instructing the base-station control device to increase a number of repetitions of transmission for the area in which a communication quality deteriorates.

11. A base-station control device to control a ground wireless base station of a train control system for controlling an operation of a train by transmitting and receiving, between an on-vehicle wireless station mounted on the train and the ground wireless base station, information that includes train control information by wireless communication, the train control information being information for controlling an operation of the train, wherein
the information that includes the train control information further includes general transmission information that is information other than the train control information, the general transmission information is transmitted only once from the ground wireless base station to the on-vehicle wireless station, transmission of the train control information is repeated a plurality of times from the ground wireless base station to the on-vehicle wireless station, among the repeatedly transmitted train control information, the on-vehicle wireless station uses, for an operation of the train, a piece of train control information, which the on-vehicle wireless station receives without lack of data for a first time, and wherein the base-station control device sets, to the ground wireless base station, a number of transmissions of the train control information.

12. A ground wireless base station of a train control system for controlling an operation of a train by transmitting and receiving, between an on-vehicle wireless station mounted on the train, information that includes train control information by wireless communication, the train control information being information for controlling an operation of the train, wherein the information that includes the train control information further includes general transmission information that is information other than the train control information, the ground wireless base station transmits the general transmission information only once to the on-vehicle wireless station, the ground wireless base station transmits the train control information repeatedly a plurality of times to the on-vehicle wireless station, and among the repeatedly transmitted train control information, the on-vehicle wireless station uses, for an operation of the train, a piece of train control information, which the on-vehicle wireless station receives without lack of data for a first time.

* * * * *